US008221833B2

(12) United States Patent
Veerasamy et al.

(10) Patent No.: US 8,221,833 B2
(45) Date of Patent: Jul. 17, 2012

(54) WINDOW WITH ANTI-BACTERIAL AND/OR ANTI-FUNGAL FEATURE AND METHOD OF MAKING SAME

(75) Inventors: Vijayen S. Veerasamy, Ann Arbor, MI (US); Jose Nunez-Regueiro, Ann Arbor, MI (US); Scott V. Thomsen, South Lyon, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/314,609

(22) Filed: Dec. 8, 2011

(65) Prior Publication Data
US 2012/0082789 A1    Apr. 5, 2012

Related U.S. Application Data

(62) Division of application No. 12/929,303, filed on Jan. 13, 2011, now Pat. No. 8,092,912, which is a division of application No. 11/412,118, filed on Apr. 27, 2006, now Pat. No. 7,892,662.

(51) Int. Cl.
*B05D 3/02* (2006.01)
(52) U.S. Cl. .............. 427/165; 427/372.2; 427/376.2
(58) Field of Classification Search ............... None
See application file for complete search history.

(56) References Cited

U.S. PATENT DOCUMENTS

| | | | |
|---|---|---|---|
| 2,461,019 A | 2/1949 | Alexander | |
| 5,059,295 A | 10/1991 | Finley | |
| 5,135,808 A | 8/1992 | Kimock et al. | |
| 5,279,808 A | 1/1994 | Xiao et al. | |
| 5,807,641 A | 9/1998 | Oku et al. | |
| 5,853,866 A | 12/1998 | Watanabe et al. | |
| 5,869,187 A | 2/1999 | Nakamura et al. | |
| 6,055,085 A | 4/2000 | Nakashima et al. | |
| 6,107,241 A | 8/2000 | Ogata et al. | |
| 6,210,779 B1 | 4/2001 | Watanabe et al. | |
| 6,235,401 B1 | 5/2001 | Ogata et al. | |
| 6,242,752 B1 | 6/2001 | Soma et al. | |
| 6,344,277 B1 | 2/2002 | Ogata et al. | |
| 6,344,278 B1 | 2/2002 | Ogata et al. | |
| 6,362,121 B1 | 3/2002 | Chopin et al. | |
| 6,376,888 B1 | 4/2002 | Tsunashima et al. | |
| 6,379,811 B2 | 4/2002 | Ogata et al. | |

(Continued)

FOREIGN PATENT DOCUMENTS

EP    1 623 657    2/2006

(Continued)

OTHER PUBLICATIONS

U.S. Appl. No. 12/929,303, filed Jan. 13, 2011; Veerasamy et al.

(Continued)

*Primary Examiner* — Timothy Speer
(74) *Attorney, Agent, or Firm* — Nixon & Vanderhye P.C.

(57) ABSTRACT

Certain example embodiments of this invention relate to a window having anti-fungal/anti-bacterial properties and/or self-cleaning properties, and a method of making the same. In certain example embodiments, a silver based layer is be provided and the layer(s) located thereover (e.g., the zirconium oxide inclusive layer) are designed to permit silver particles to migrate/diffuse to the surface over time to kill bacteria/ germs at the surface of the coated article thereby creating an anti-bacterial/anti-fungal effect. In certain example embodiments, silver may also or instead be mixed in with other material as the top layer of the anti-bacterial coating.

5 Claims, 4 Drawing Sheets

U.S. PATENT DOCUMENTS

| | | | |
|---|---|---|---|
| 6,387,844 B1 | 5/2002 | Fujishima et al. |
| 6,572,940 B1 | 6/2003 | Noethe et al. |
| 6,576,349 B2 | 6/2003 | Lingle et al. |
| 6,663,753 B2 | 12/2003 | Veerasamy et al. |
| 6,743,348 B2 | 6/2004 | Holladay et al. |
| 6,818,309 B1 | 11/2004 | Talpaert et al. |
| 6,884,752 B2 | 4/2005 | Andrews |
| 6,887,575 B2 | 5/2005 | Neuman et al. |
| 6,936,347 B2 | 8/2005 | Laird et al. |
| 6,939,611 B2 | 9/2005 | Fujishima et al. |
| 6,974,630 B1 | 12/2005 | Stachowiak |
| 6,991,339 B2 | 1/2006 | Tonar et al. |
| 7,004,591 B2 | 2/2006 | Kobayashi et al. |
| 7,005,189 B1 | 2/2006 | Tachibana et al. |
| 7,005,190 B2 | 2/2006 | Laird |
| 7,150,849 B2 | 12/2006 | Veerasamy |
| 7,449,218 B2 | 11/2008 | Veerasamy |
| 7,501,148 B2 | 3/2009 | Veerasamy |
| 7,507,442 B2 | 3/2009 | Veerasamy |
| 7,846,492 B2 | 12/2010 | Veerasamy et al. |
| 7,892,662 B2 | 2/2011 | Veerasamy et al. |
| 8,092,912 B2 | 1/2012 | Veerasamy et al. |
| 2002/0045073 A1 | 4/2002 | Finley |
| 2002/0107144 A1 | 8/2002 | Fujishima et al. |
| 2003/0049464 A1 | 3/2003 | Glenn et al. |
| 2003/0170464 A1 | 9/2003 | Veerasamy |
| 2003/0235720 A1 | 12/2003 | Athey et al. |
| 2004/0258926 A1 | 12/2004 | Veerasamy |
| 2005/0048284 A1 | 3/2005 | Veerasamy |
| 2005/0095430 A1 | 5/2005 | Veerasamy |
| 2005/0095431 A1 | 5/2005 | Veerasamy |
| 2005/0191494 A1 | 9/2005 | Veerasamy |
| 2005/0234178 A1 | 10/2005 | Andrews |
| 2006/0003545 A1 | 1/2006 | Veerasamy |
| 2006/0057294 A1 | 3/2006 | Veerasamy et al. |
| 2006/0166008 A1 | 7/2006 | Hsiao et al. |
| 2006/0166009 A1 | 7/2006 | Veerasamy et al. |
| 2007/0017624 A1 | 1/2007 | Thomsen et al. |
| 2007/0042186 A1 | 2/2007 | Veerasamy |
| 2007/0042187 A1 | 2/2007 | Veerasamy |

FOREIGN PATENT DOCUMENTS

| | | |
|---|---|---|
| EP | 1 637 225 | 3/2006 |
| EP | 1 640 149 | 3/2006 |
| GB | 2 186 001 | 8/1987 |
| JP | 11-263629 | 9/1999 |
| JP | 2001-300326 | 10/2001 |
| JP | 2002-151000 | 5/2002 |
| WO | WO 2004/113064 | 12/2004 |

OTHER PUBLICATIONS

Milosev et al., "Comparison of TiN, ZrN, and CrN Hard Nitride Coating: Electrochemical and Thermal Oxidation". 1997. Thin Film Solids 303, pp. 246-254.

Sato JP 2001-300326 English Machine Translation (www.jpo.org).

Sato JP 2001-300326 Patent Abstract of Japan (www.jpo.org).

Sintef Materials and Chemistry, "Nanosized oxide powders—Spray Pyrolysis", obtained Oct. 2009.

Rahaman ("Ceramic Processing", published 2006).

WINDOW WITH ANTI-BACTERIAL AND/OR ANTI-FUNGAL FEATURE AND METHOD OF MAKING SAME

This application is a divisional of application Ser. No. 12/929,303, filed Jan. 13, 2011 (now U.S. Pat. No. 8,092,912), which is a divisional of Ser. No. 11/412,118, filed Apr. 27, 2006 (now U.S. Pat. No. 7,892,662), the entire disclosures of which are all hereby incorporated herein by reference in this application.

This invention relates to a window having anti-fungal/anti-bacterial properties and/or self-cleaning properties, and a method of making the same.

BACKGROUND OF THE INVENTION

Vehicle windows (e.g., windshields, backlites, sunroofs, and sidelites) are known in the art. For purposes of example, vehicle windshields typically include a pair of bent glass substrates laminated together via a polymer interlayer such as polyvinyl butyral (PVB). It is known that one of the two glass substrates may have a coating (e.g., low-E coating) thereon for solar control purposes such as reflecting IR and/or UV radiation, so that the vehicle interior can be more comfortable in certain weather conditions. Conventional vehicle windshields are made as follows. First and second flat glass substrates are provided, one of them optionally having a low-E coating sputtered thereon. The pair of glass substrates are washed and booked together (i.e., stacked on one another), and then while booked are heat bent together into the desired windshield shape at a high temperature(s) (e.g., 8 minutes at about 600-625 degrees C.). The two bent glass substrates are then laminated together via the polymer interlayer to form the vehicle windshield.

Insulating glass (IG) windows are also known in the art. Conventional IG window units include at least first and second glass substrates (one of which may have a solar control coating on an interior surface thereof) that are coupled to one another via at least one seal(s) or spacer(s). The resulting space or gap between the glass substrates may or may not be filled with gas and/or evacuated to a low pressure in different instances. However, many IG units are required to be tempered. Thermal tempering of the glass substrates for such IG units typically requires heating the glass substrates to temperature(s) of at least about 600 degrees C. for a sufficient period of time to enable thermal tempering. Monolithic architectural windows for use in homes or building are also known in the art, and may have a single glass substrate. Again, monolithic windows are often thermally tempered for safety purposes, such tempering involving high temperature during heat treatment.

Other types of coated articles also require heat treatment (HT) (e.g., tempering, heat bending, and/or heat strengthening) in certain applications. For example and without limitation, glass shower door windows, glass table tops, and the like require HT in certain instances.

Germs are becoming of increasing concern across the world, especially in view of the large amount of international travel taking place in today's society. Sicknesses such as "bird flu", Severe Acute Respiratory Syndrome (SARS), and other types of flu have surfaced around the world in recent years and have resulted in many deaths. There exists a need in the art for elements such as windows that are capable of killing germs and/or bacteria, thereby reducing the likelihood of persons becoming sick due to the flu, SARS, bird flu, and the like. It would be highly advantageous if such characteristics of a window could be combined with scratch resistant features.

Photocatalytic coatings are also sometimes desirable in window applications. Photocatalytic coatings are also known as self-cleaning coatings, where the coating reacts with and decomposes organic compounds or pollutants into inorganic non-harmful compounds such as $CO_2$ and/or $H_2O$.

Accordingly, in certain example embodiments of this invention, it will be appreciated that there exists a need in the art for a coated article (e.g., for use in a window or table-top glass) having anti-fungal/anti-bacterial properties. In certain example embodiments of this invention, it may also be desirable for the coated article to have self-cleaning properties and/or scratch resistance properties. In certain example non-limiting instances, it would be advantageous to provide a window that is both scratch resistant and could function to kill certain bacteria and/or fungus which come into contact with the window thereby reducing the chances of persons in buildings using such windows becoming sick. In certain example instances, it would be advantageous to provide a window that is both scratch resistant and could function in a self-cleaning manner in certain example non-limiting instances. In still further example non-limiting embodiments, it would be desirable to provide a window having both photocatalytic functions and anti-fungal/anti-bacterial functions. While coatings herein are often used in the context of windows, they also may be used in the context of table-tops or in other applications in certain example instances.

BRIEF SUMMARY OF EXAMPLES OF INVENTION

Certain example embodiments of this invention relate to a window having anti-fungal/anti-bacterial properties and/or self-cleaning properties, and a method of making the same. In certain example non-limiting embodiments, there is provided a method of making a coated article (e.g., window such as for a vehicle, building, shower door, or the like) that is capable of being heat treated so that after being heat treated (HT) the coated article is scratch resistant to an extent more than uncoated glass.

In certain example embodiments of this invention, an anti-fungal and/or anti-bacterial silver inclusive layer is provided under one or more layers. The layer(s) over the silver are specially designed so as to be porous thereby permitting silver particles to migrate or diffuse therethrough to the surface of the window over long periods of time. The porous layer(s) over the silver may be of or include a metal oxide in certain example embodiments of this invention, such as an oxide of titanium or zirconium. For example, the porous layer(s) over the silver may be designed so as to have a stress and/or density that causes some degree of porosity therein which permits the silver to migrate/diffuse to the surface of the window by way of zig-zagging through grain boundaries defined in the porous layer(s). In other example embodiments, the porous layer(s) over the silver may be designed so as to have tiny pinholes and/or nano-holes defined therein which permit the silver to migrate/diffuse therethrough to the surface of the window over time. Alternatively, the porous layer(s) may permit the silver particles to migrate to the surface over time through a combination of tiny pinholes and via grain boundaries in the porous layer(s). When the silver particles reach the surface in a substantially continuous manner over time, they function to kill at least some bacteria and/or fungus that may come into contact with the silver, or proximate the silver, on the surface of the window.

In certain example embodiments, the silver is protected from the environment by the porous layer(s) provided over the silver. It is noted that the silver layer may be a continuous layer of or based on silver in certain example embodiments, but alternatively may be a non-continuous layer made up of a plurality of spaced apart silver or silver based particles or globs (e.g., colloids) in other example embodiments. One or more porous layer(s) over the silver may be photocatalytic (self-cleaning) in certain example embodiments of this invention.

In certain example embodiments of this invention, a photocatalytic layer (e.g., of or including crystalline $TiO_2$ such as the anatase type) is provided over a zirconium oxide inclusive layer in a window unit. Such embodiments may or may not be used in combination with the silver inclusive anti-bacterial/anti-fungal feature discussed herein (e.g., the photocatalytic layer and the zirconium oxide inclusive layer may both be porous and may both be located over the silver in anti-bacterial/anti-fungal embodiments). The use of the zirconium oxide layer under the photocatalytic layer significantly improves the durability of the coated article, while permitting the article to realize low contact angle ($\theta$) and self-cleaning which are both desirable in many situations.

Coated articles according to certain example embodiments of this invention may be used in the context of shower door windows, architectural windows, vehicle windows, IG window units, picture frame windows, or the like. While coated articles according to this invention are particularly adapted for use in windows, this invention is not so limited as coated articles according to this invention may also be used for table tops or any other suitable application.

Methods of making such coated articles for use in windows or the like are also provided. In certain example embodiments, a layer of or including zirconium nitride and/or zirconium oxide is formed on a glass substrate. In certain example instances, the zirconium nitride and/or oxide layer may be doped with other material(s) such as F, C and/or Ce. Optional fluorine (F) and carbon (C) dopants, for example, have been found to increase visible transmission of the coated article. While the zirconium nitride and/or oxide is formed on the glass substrate, there may be other layer (e.g., a silver based layer) therebetween; thus, the word "on" is not limited to directly on herein. Optionally, a carbon inclusive layer (e.g., diamond-like carbon (DLC)) may be provided over the zirconium inclusive layer. This carbon inclusive layer may be used to generate energy during heat treatment (HT) for transforming at least another layer in the coating so as to form a new post-HT layer(s) which was not present in the post-HT form before the HT (e.g., the zirconium nitride may be transformed into zirconium oxide as a result of the HT; and/or the zirconium based layer may have a degree of tensile stress therein post-HT which was not present in the layer pre-HT). The coated article including the zirconium nitride and/or oxide layer, the silver based layer (optional), and the carbon inclusive layer (optional) is heat treated for thermal tempering or the like. As a result of the heat treating, the zirconium nitride inclusive layer if used transforms into a layer comprising zirconium oxide (this post-HT zirconium oxide layer may or may not include nitrogen in different embodiments). The post-HT layer of or including zirconium oxide is scratch resistant (SR) in certain example embodiments. In certain example instances, the heat treatment also causes a change in stress of the zirconium based layer (e.g., the zirconium based layer may have a degree of tensile stress therein post-HT which was not present in the layer pre-HT), such stress permitting crystal grain boundaries and/or tiny pinholes to be present in the layer to allow optional silver migration therethrough over time. Following the heat treatment, optionally, a photocatalytic layer (e.g., of or including crystalline $TiO_2$ such as of the anatase type) can be formed on the glass substrate over the zirconium oxide inclusive layer and over the optional silver based layer. The photocatalytic layer may be formed using a colloidal solution, and/or a sol-gel, with subsequent curing, in certain example embodiments of this invention.

In certain example embodiments of this invention, there is provided coated article including a coating supported by a glass substrate, the coating comprising: a layer comprising silver on the glass substrate; a layer comprising zirconium oxide ($Zr_xO_y$), where y/x is from about 1.2 to 2.5, on the glass substrate over at least the layer comprising silver; a photocatalytic layer comprising an anatase oxide of titanium on the glass substrate over at least the layer comprising silver and the layer comprising zirconium oxide; and wherein each of the layer comprising zirconium oxide and the photocatalytic layer comprising the anatase oxide of titanium are porous so as to permit silver from the layer comprising silver to migrate and/or diffuse to the outwardmost surface of the coated article over time.

In other example embodiments of this invention, there is provided a coated article including a coating supported by a glass substrate, the coating comprising: a layer comprising silver; a layer comprising zirconium oxide on the glass substrate over at least the layer comprising silver; a photocatalytic layer comprising at least one metal oxide on the glass substrate over at least the layer comprising silver and the layer comprising zirconium oxide; and wherein each of the layer comprising zirconium oxide and the photocatalytic layer comprising the metal oxide are porous so as to permit silver from the layer comprising silver to migrate and/or diffuse to the outwardmost surface of the coated article over time.

In still further example embodiments of this invention, there is provided a anti-bacterial window including an anti-bacterial coating supported by a glass substrate, the coating comprising: a layer comprising silver; at least one layer comprising a metal oxide on the glass substrate over at least the layer comprising silver; and wherein all layer(s) on the glass substrate over the layer comprising silver are porous so as to permit silver from the layer comprising silver to migrate and/or diffuse to the outwardmost surface of the coating over time, said outermost surface of the coating also being a major surface of the window.

In other example embodiments of this invention, there is provided a method of making an anti-bacterial coated article, the method comprising: providing a glass substrate; forming a layer comprising silver on the glass substrate; forming a porous layer comprising a metal oxide on the glass substrate over at least the layer comprising silver, so that the porous layer comprising the metal oxide is sufficient porous so as to cause silver from the layer comprising silver to migrate and/or diffuse outwardly to the surface of the coated article over time.

In still further example embodiments of this invention, there is provided a method of making a coated article, the method comprising: providing a glass substrate; depositing in wet form on the glass substrate a colloidal dispersion including each of metal oxide colloids and silver colloids; and curing the colloidal dispersion so as to form an anti-bacterial and/or anti-fungal layer comprising each of the metal oxide and silver as an outermost layer of a coating on the glass substrate.

In certain example embodiments of this invention, the silver (Ag) may be replaced by or supplemented by copper (Cu).

DETAILED DESCRIPTION OF EXAMPLE EMBODIMENTS OF THE INVENTION

Figure 1:
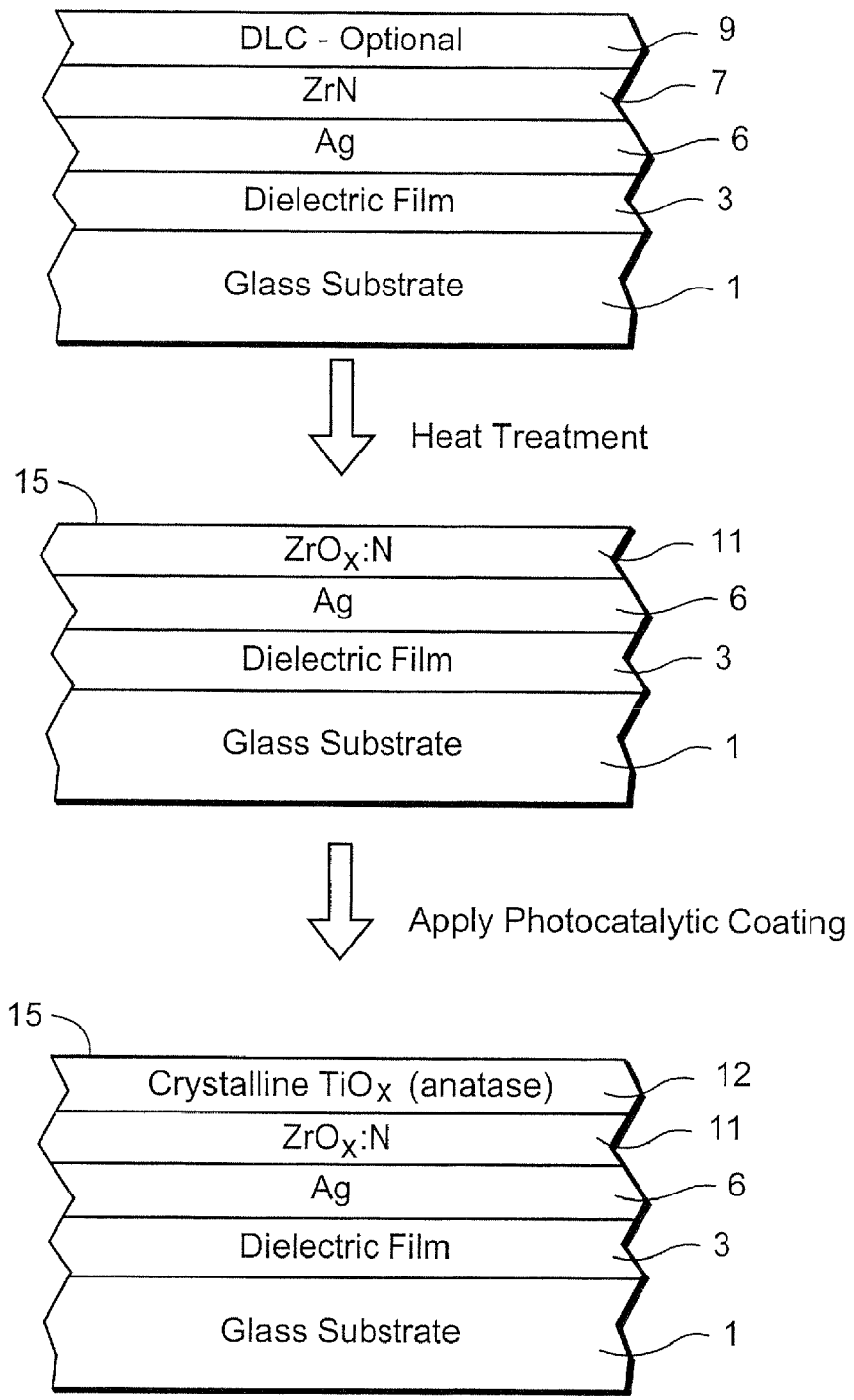
FIG. 1 is a schematic diagram illustrating a method of making an anti-bacterial/anti-fungal coated article according to an example embodiment of this invention, before and after optional heat treatment.

Referring now more particularly to the accompanying drawings in which like reference numerals indicate like parts or layers throughout the several views.

Certain example embodiments of this invention relate to a window having anti-fungal/anti-bacterial properties and/or self-cleaning properties, and a method of making the same. Coated articles according to certain example embodiments of this invention may be used in the context of shower door windows, architectural windows, vehicle windows, IG window units, picture frame windows, or the like. While coated articles according to this invention are particularly adapted for use in windows, this invention is not so limited, as coated articles according to this invention may also be used for table tops or any other suitable application. The coated article may be heat treated in certain instances. In certain example embodiments of this invention, there is provided a method of making a coated article (e.g., window such as for a vehicle, building, shower door, or the like) that is capable of being heat treated so that after being heat treated (HT) the coated article is scratch resistant to an extent more than uncoated glass.

Figure 2:
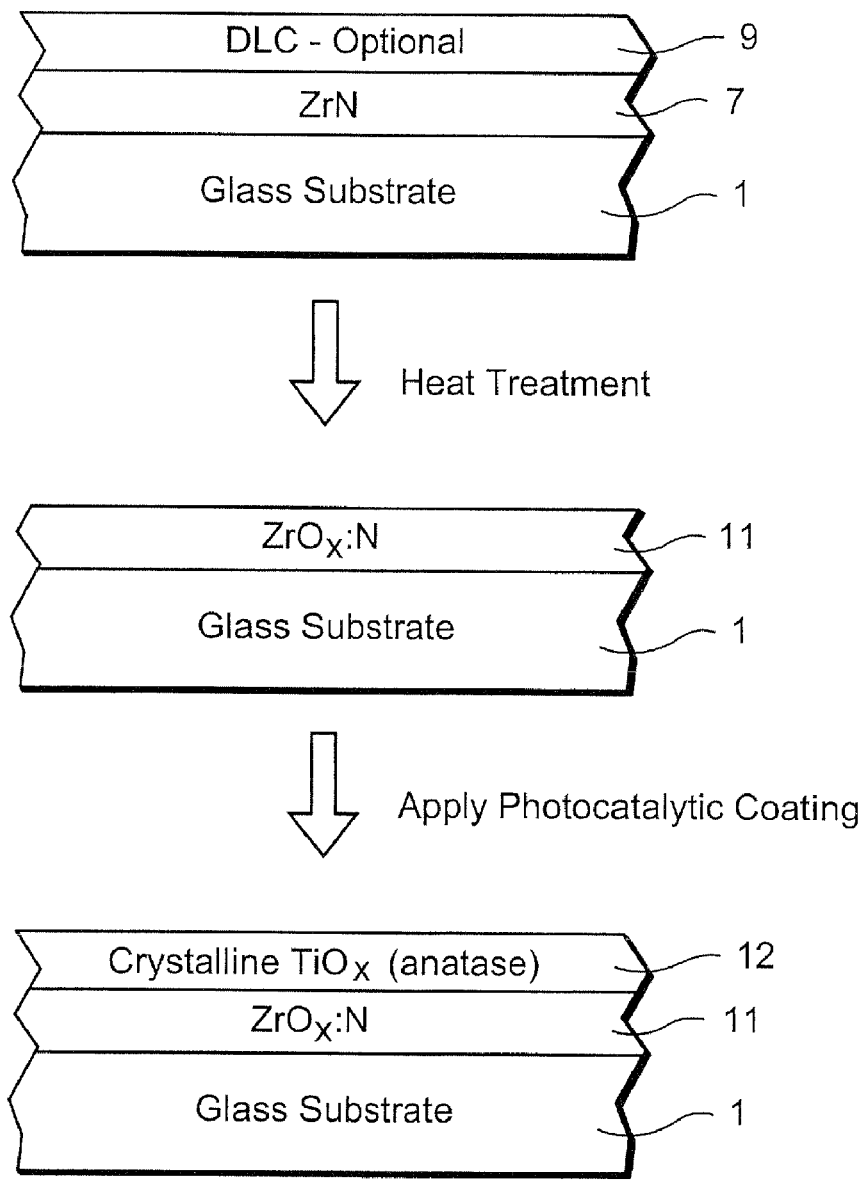
FIG. 2 is a schematic diagram illustrating a method of making a photocatalytic coated article according to another embodiment of this invention, before and after heat treatment.
Figure 3:
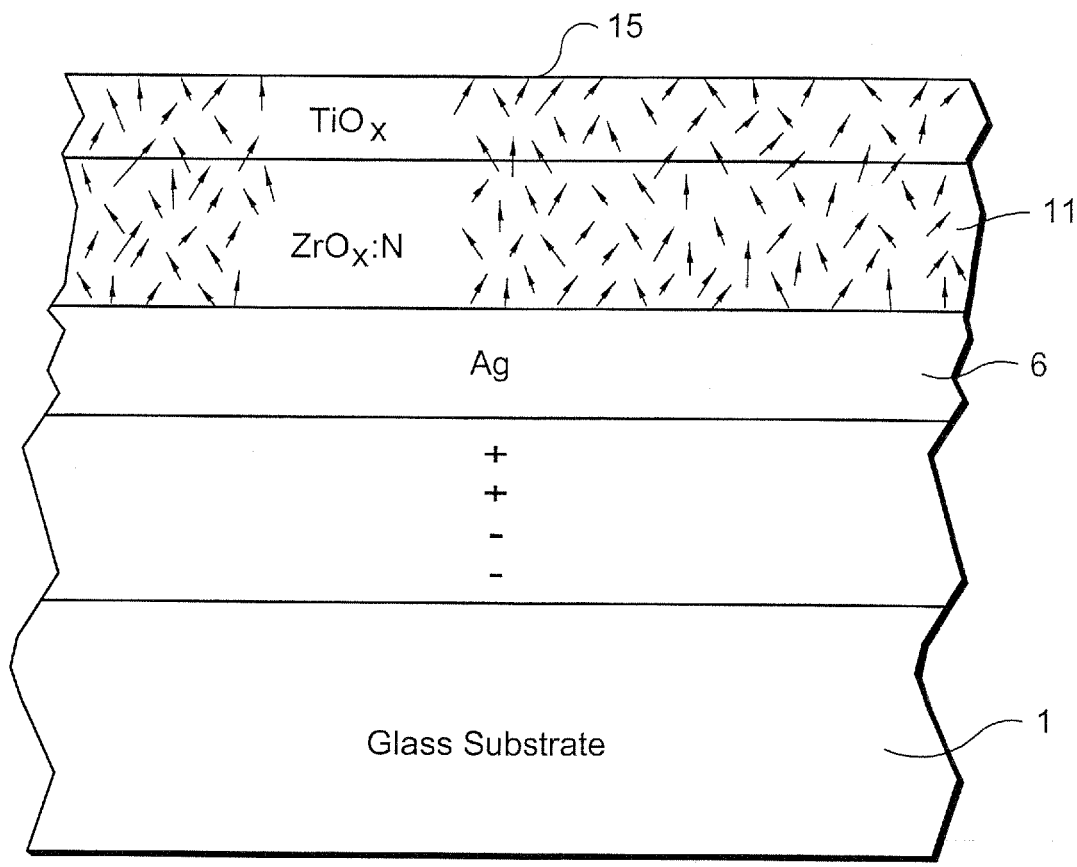
FIG. 3 is a cross sectional view of a coated article made according to the FIG. 1 embodiment, the view schematically showing how silver particles migrate or diffuse to the surface of the article over time for an anti-bacterial/anti-fungal effect.

FIG. 1 is a schematic diagram illustrating a method of making an anti-bacterial/anti-fungal coated article for use in a window or the like according to an example embodiment of this invention, before and after optional heat treatment; and FIG. 3 is a cross sectional view of a coated article made according to the FIG. 1 embodiment. The FIG. 1, 3 embodiment may or may not include the photocatalytic top layer in different alternatives of this invention. Meanwhile, the FIG. 2 embodiment does not have the silver based layer and instead is a schematic diagram illustrating a method of making a photocatalytic coated article according to another embodiment of this invention, before and after heat treatment. Before getting into much detail, a general description of the various embodiments will be made with respect to FIGS. 1-3.

In certain example embodiments of this invention, referring to FIGS. 1 and 3, an anti-fungal and/or anti-bacterial silver inclusive layer 6 is provided on a glass substrate 1 under one or more layers (e.g., one or more of layers 7, 9, 11 and/or 12). In the final product, the layers 11 and 12 (or just layer 11 if layer 12 is not used) over the silver 6 are specially designed so as to be porous thereby permitting silver particles originating from the silver based layer 6 to migrate or diffuse therethrough to the surface 15 of the window over long periods of time. The porous layer(s) 11, 12 over the silver 6 may be of or include a metal oxide in certain example embodiments of this invention, such as an oxide of titanium or zirconium.

For example, the porous layer(s) 11, 12 over the silver 6 may be designed so as to have a stress and/or density that causes some degree of porosity therein which permits silver based particles from the silver layer 6 to migrate/diffuse to the surface 15 of the window by way of zig-zagging through grain boundaries defined in the porous layer(s) 11, 12 (e.g., see FIG. 3). In certain example embodiments, the porous layer(s) 11 and/or 12 over the silver 6 may be designed so as to have tiny pinholes and/or nano-holes defined therein which permit the silver particles originating from layer 6 to migrate/diffuse therethrough to the surface 15 of the window over time (e.g., see FIG. 3). Alternatively, the porous layer(s) 11 and/or 12 may permit the silver particles from the silver based layer 6 to migrate to the surface 15 over time through a combination of tiny pinholes and via grain boundaries in the porous layer(s) (e.g., see FIG. 3). When the silver particles from the silver layer 6 reach the surface 15 in a substantially continuous manner over time, they function to kill at least some bacteria and/or fungus that may come into contact with the silver, or proximate the silver, on the surface 15 of the window.

It is noted that the amount or degree of silver migration/diffusion may be controlled by environmental factors such as humidity and/or temperature. For instances, little or no migration may occur at very low temperatures and/or in low humidity conditions. However, increased silver migration/diffusion to the surface 15 may occur when the window is exposed to high humidity and/or high temperature conditions. Thus, it will be appreciated that the silver migration/diffusion does not have to be constant, either with respect to degree of existence.

In certain example embodiments, the silver based layer 6 where the silver based particles originate is protected from the environment by the porous layer(s) 1 and/or 12 provided over the silver based layer 6. It is noted that the silver layer 6 may be a continuous layer of or based on silver in certain example embodiments, but alternatively may be a non-continuous layer made up of a plurality of spaced apart silver or silver based particles or globs (e.g., colloids) in other example embodiments.

Referring to FIGS. 1-3, one or more porous layer(s) 12 over the silver 6 may be photocatalytic (self-cleaning) in certain example embodiments of this invention. In certain example embodiments of this invention, a photocatalytic layer 12 (e.g., of or including crystalline $TiO_2$ such as of the anatase type) is provided over a zirconium oxide inclusive layer 11 in a window unit. Such embodiments may or may not be used in combination with the silver 6 inclusive anti-bacterial/anti-fungal feature discussed herein (e.g., the photocatalytic layer 12 and the zirconium oxide inclusive layer 11 may both be porous and may both be located over the silver 6 in anti-bacterial/anti-fungal embodiments, but need not be porous in embodiments where the silver 6 is not used such as in the FIG. 2 embodiment). The use of the zirconium oxide layer 11 under the photocatalytic layer 12 significantly improves the durability of the coated article, while permitting the article to realize low contact angle ($\theta$) and self-cleaning which are both desirable in many situations.

Methods of making such coated articles for use in windows or the like are also provided. In certain example embodiments, a layer 7 of or including zirconium nitride and/or zirconium oxide is formed on a glass substrate 1. In certain example instances, the zirconium nitride and/or oxide layer 7 may be doped with other material(s) such as F, C and/or Ce. Optional fluorine (F) and carbon (C) dopants, for example, have been found to increase visible transmission of the coated article following HT. While the zirconium nitride and/or oxide layer 7 is formed on the glass substrate, there may be other layer(s) (e.g., a silver based layer 6 and/or a dielectric film 3) therebetween; thus, the word "on" is not limited to directly on herein. Optionally, a carbon inclusive layer (e.g., diamond-like carbon (DLC)) 9 may be provided over the zirconium inclusive layer 7. This carbon inclusive layer 9 may be used to generate energy during heat treatment (HT) for transforming at least another layer (e.g., 7) in the coating so as to form a new post-HT layer(s) (e.g., 11) which was not present in the post-HT form before the HT (e.g., the zirconium nitride may be transformed into zirconium oxide as a result of the HT; and/or the zirconium based layer may have a degree of tensile stress therein post-HT which was not present in the layer pre-HT). The coated article including the zirconium nitride and/or oxide layer 7, the silver based layer (optional) 6, and the carbon inclusive layer (optional) 9 is heat treated for thermal tempering or the like. As a result of the heat treating, the zirconium nitride inclusive layer 7 if used transforms into a layer comprising zirconium oxide 11. This post-HT zirconium oxide based layer 11 may or may not include nitrogen in different embodiments of this invention. The post-HT layer of or including zirconium oxide 11 is scratch resistant (SR) in certain example embodiments.

In certain instances, the heat treatment (HT) may involve heating the supporting glass substrate, with the layers thereon, to temperature(s) of from 550 to 800 degrees C., more preferably from 580 to 800 degrees C. (which is well above the burn-off temperature of DLC). Certain example embodiments of this invention relate to a technique for allowing the post-HT coated article to be more scratch resistant than uncoated glass.

In certain example instances, the zirconium based layer 7 may be initially formed in a manner which causes the heat treatment to cause a change in stress of the zirconium based layer from pre-HT layer 7 to post-HT layer 11. For instance, the zirconium nitride based layer 7 prior to HT may have compressive stress, or substantially no stress, and following HT the post-HT zirconium oxide inclusive layer 11 may have as a result of the HT a degree of tensile stress which permits or causes crystal grain boundaries and/or tiny pinholes or nanoholes to be present in the layer 11 to allow silver migration therethrough over time. Following the heat treatment, optionally, a photocatalytic layer (e.g., of or including crystalline $TiO_2$ such as of the anatase type) 12 may be formed on the glass substrate 1 over the zirconium oxide inclusive layer 11 and over the optional silver based layer 6. The photocatalytic layer 12 may be formed using a colloidal solution, and/or a sol-gel, with subsequent curing, in certain example embodiments of this invention.

Figure 4:
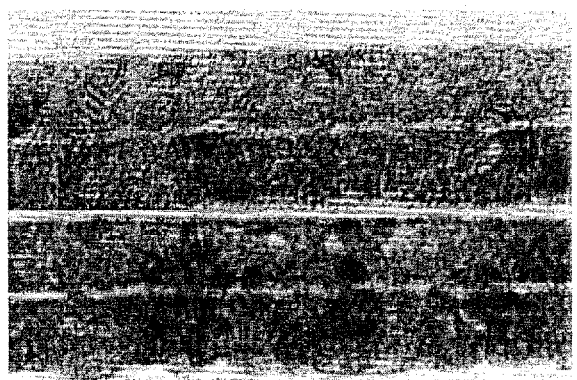
FIG. 4 is a cross sectional view of a coated article according to an example of this invention, illustrating silver ions stored between layers of zirconia.
Figure 5:
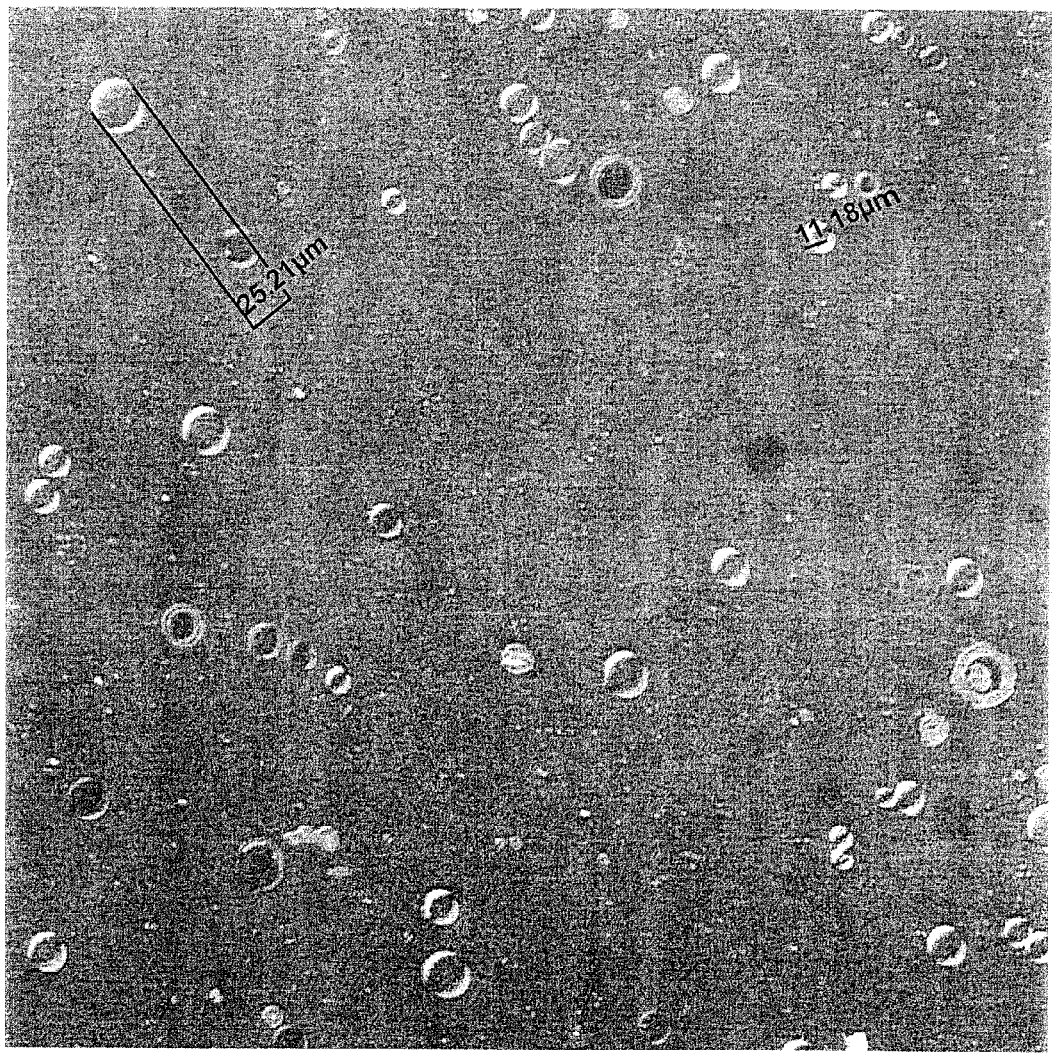
FIG. 5 is a top view illustrating how stress evolves for the FIG. 4 article after heat treatment, to provide micro-channels perpendicular to the plane of the film.

FIG. 4 is a cross sectional view of a coated article according to an example of this invention, illustrating silver ions of layer 6 stored between layers 3 and 11 of zirconia (zirconium oxide). Meanwhile, FIG. 5 is a top view illustrating how stress evolves for the FIG. 4 article after heat treatment, to provide micro-channels or nanoholes perpendicular to the plane of the film. As explained above, these micro-channels or nanoholes in at least layer 11 allow silver migration therethrough over time toward the upper surface of the coated article.

Now, a more detailed discussed will be made as to certain example embodiments of this invention and as to how such embodiments may be made.

Turning first to the FIG. 1, 3 embodiment of this invention, an example description is provided as to how this embodiment may be made in certain example instances.

FIG. 1 is a schematic diagram illustrating how a coated article can be made according to an example embodiment of this invention. Initially, a coated article is formed using a glass substrate 1 as a support. The coated article includes, supported by glass substrate 1, at least one optional dielectric barrier film 3, a layer of or including silver 6 provided for anti-fungal and/or anti-bacterial purposes, a layer of or including zirconium nitride 7 (e.g., ZrN, or any other suitable stoichiometry), and an optional top layer of or including carbon such as DLC 9. Glass substrate 1 is typically of or includes soda-lime-silica glass, although other types of glass may be used in certain instances.

Dielectric barrier film 3 includes one or more layers and is provided in order to prevent sodium diffusion from the glass substrate 1 into the silver 6 during and/or after HT (i.e., a diffusion barrier). Dielectric barrier film 3 may comprise a layer(s) of or including zirconium oxide, zirconium nitride, zirconium oxynitride, zinc oxide, silicon nitride, silicon oxynitride, silicon oxide, or the like. Barrier film 3 may have compressive stress both before and after HT in certain example embodiments of this invention, since compressive stress may help the film to block sodium migration from the glass substrate. Barrier layer(s) 3 is formed on the glass substrate 1 via sputtering, or via any other suitable technique. Dielectric barrier film 3 is from about 50-1,000 Å thick, more preferably from about 80-500 Å thick, in certain example embodiments of this invention.

Silver based layer 6 is provided on the glass substrate 1 over at least the optional barrier film 3 in certain example embodiments. However, it is possible for the silver based layer 6 to be formed directly on the glass substrate 1 when dielectric barrier film 3 is not used. Silver layer 6 may be from about 20-400 Å thick, more preferably from about 20-200 Å thick, and even more preferably from about 20-100 Å thick, in certain example embodiments, of this invention. Because the coated article is used in window applications or the like, the silver layer 6 is thin enough so as to be substantially transparent in certain example embodiments, but thick enough so as to provide sufficient silver for anti-bacterial and/or anti-fungal purposes. Moreover, the silver based layer 6 may also function as an infrared (IR) blocking layer in certain example embodiments of this invention, thereby permitting the window to block additional IR radiation from entering a building or the like. The silver layer 6 may be continuous or discontinuous in different embodiments of this invention.

Still referring to the product in FIG. 1 prior to HT, zirconium nitride and/or zirconium oxide inclusive dielectric layer 7 may be provided on the glass substrate 1 between silver based layer 6 and carbon inclusive layer 9 in certain example embodiments of this invention, as shown in FIG. 1. In certain example embodiments, zirconium nitride inclusive layer 7 may be located directly between layers 6 and 9; however in other example embodiments other layer(s) (not shown) may be provided between the zirconium nitride inclusive layer 7 and one or both of layers 6, 9. The zirconium nitride inclusive layer 7 may consist essentially of (a) zirconium and nitride, (b) zirconium and oxygen, or (c) zirconium, oxygen and nitrogen in different example embodiments of this invention. However, the zirconium inclusive dielectric layer 7 may also include other materials including but not limited to dopants such as Al, F, Ce, C or the like in certain example embodiments of this invention. Zirconium inclusive dielectric layer 7 may be formed by sputtering or the like in certain example embodiments of this invention.

The pre-HT layer 7 may include from about 10-70% Zr, more preferably from about 30-65% Zr, even more preferably from about 40-60% Zr, and most preferably from about 45-55% Zr in terms of atomic %; and from about 20-60% N, more preferably from about 30-50% N in terms of atomic %, in certain example embodiments of this invention. In certain example embodiments of this invention, zirconium nitride inclusive layer 7 may have a density of at least 6 gm/cm$^3$, more preferably at least 7 gm/cm$^3$. Additionally, in certain example embodiments, zirconium nitride inclusive layer 7 may have an average hardness of at least 650 kgf/mm, more preferably of at least 700 kgf/mm, and/or may have a bond overlap population of at least 0.25 (more preferably at least about 0.30) for strength purposes. In certain example instances, many of the Zr—N bonds in layer 7 may be of the covalent type, which are stronger than ionic bonds, for strength purposes. It is also noted that in certain example embodiments of this invention, the ZrN of layer 7 may have a melting point of at least 2,500 degrees C., and it may be about 2,980 degrees C. in certain example instances. In certain example embodiments of this invention, the zirconium nitride of layer 7 may be represented by $Zr_xN_y$, where the ratio x:y is from 0.8 to 1.2, and is preferably about 1.0 in certain example embodiments. Zirconium inclusive layer 7 may have compressive stress as originally formed on the glass substrate prior to HT. These same zirconium nitride characteristics that are explained above with respect to layer 7 also apply to layer 3 when the layer 3 is formed of zirconium nitride and/or oxide.

The optional layer 9 comprising DLC may be of any suitable type of DLC, including but not limited to any of the DLC types described in any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and/or 5,470,661, all of which are hereby incorporated herein by reference. For purposes of example only, DLC inclusive layer 9 may be from about 5 to 1,000 angstroms (Å) thick in certain example embodiments of this invention, more preferably from 10-300 Å thick, and most preferably from 45 to 65 Å thick. In certain example embodiments of this invention, DLC layer 9 may have an average hardness of at least about 10 GPa, more preferably at least about 20 GPa, and most preferably from about 20-90 GPa. Such hardness renders layer 9 resistant to scratching, certain solvents, and/or the like. Layer 9 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC:H type of DLC 9 may include from 4 to 39% hydrogen, more preferably from 5-30% H, and most preferably from 10-20% H. This t-aC or t-aC:H type of DLC for layer 9 may include more $sp^3$ carbon-carbon (C—C) bonds than $sp^2$ carbon-carbon (C—C) bonds. In certain example embodiments, at least about 50% of the carbon-carbon bonds in DLC layer 9 may be $sp^3$ type carbon-carbon (C—C) bonds, more preferably at least about 60% of the carbon-carbon bonds in the layer 9 may be $sp^3$ carbon-carbon (C—C) bonds, and most preferably at least about 70% of the carbon-carbon bonds in the layer 9 may be $sp^3$ carbon-carbon (C—C) bonds. In certain example embodiments of this invention, the DLC in layer 9 may have an average density of at least about 2.4 gm/cm$^3$, more preferably at least about 2.7 gm/cm$^3$.

The DLC based layer 9 may be formed in any suitable manner, such as using an ion beam(s) from at least one ion source. Example linear ion beam sources that may be used to deposit DLC inclusive layer 9 on substrate 1 include any of those in any of U.S. Pat. Nos. 6,261,693, 6,002,208, 6,335,086, or 6,303,225 (all incorporated herein by reference). When using an ion beam source to deposit layer 9, hydrocarbon feedstock gas(es) (e.g., $C_2H_2$), HMDSO, or any other suitable gas, may be used in the ion beam source(s) in order to cause the source to emit an ion beam toward substrate 1 for forming layer 9. It is noted that the hardness and/or density of layer 9 may be adjusted by varying the ion energy of the depositing apparatus. In certain example embodiments, at least about 2,000 V (anode to cathode volts), e.g., about 3,000 V, may be used in the ion source in depositing layer 9. It is noted that the phrase "on the substrate" as used herein is not limited to being in direct contact with the substrate as other layer(s) may still be provided therebetween.

For purposes of example only, certain example thicknesses for the pre-HT layers shown at the top of FIG. 1 are set forth below, with the layers being listed in order from the glass substrate outwardly.

Example Coating (Top of FIG. 1)

Layer Thicknesses (Pre-HT)

| Layer | General | More Preferred | Most Preferred |
|---|---|---|---|
| Dielectric (film 3) | 50-1,000 Å | 80-500 Å | 120-250 Å |
| Silver (layer 6) | 20-400 Å | 20-200 Å | 20-100 Å |
| ZrN (layer 7) | 40-500 Å | 50-400 Å | 90-220 Å |
| DLC (layer 9) | 5-1,000 Å | 10-300 Å | 40-65 Å |

Once the pre-HT coated article shown at the top of FIG. 1 is formed, it may be subjected to heat treatment sufficient for at least one of heat bending, thermal tempering, and/or heat strengthening. Referring to FIG. 1, when subjected to HT (e.g., in a furnace using temperature(s) of from 550 to 800 degrees C., more preferably from 580 to 800 degrees C.), the upper or outer DLC inclusive layer 9 if provided burns off due to combustion because of the high temperatures used during HT. In particular, at least DLC layer 9 (which may be hydrogenated) may act as a fuel which upon combustion with oxygen from the atmosphere during HT produces carbon dioxide and water. This exothermic reaction, caused by combustion of hydrogenated carbon from at least DLC layer 9, may cause spontaneous propagation of a combustion wave through the initial reactants. The high temperature developed during this combustion heats the layer 7 comprising zirconium nitride and/or oxide to a temperature(s) well above the heat treating temperature used by the furnace. For example, the combustion of the DLC 9 and/or from the HT may heat part of all of the layer 7 comprising zirconium nitride and/or oxide to a temperature of at least about 1200 degrees C., more preferably at least about 1500 degrees C., and most preferably at least about 2,000 degrees C.

Because the layer 7 comprising zirconium nitride and/or oxide is heated to such a high temperature due to the DLC combustion during HT, at least a substantial portion of the zirconium nitride therein is transformed during the HT into a new post-HT layer of or including zirconium oxide 11. In other words, the HT causes at least a substantial portion of the nitride to transform into an oxide. The new post-HT layer comprising zirconium oxide 11, shown in the middle and bottom portions of FIG. 1, may also include nitrogen (and/or other dopants) in certain example embodiments of this invention (e.g., ZrO:N; $ZrO_2$:N; or any other suitable stoichiometry). The new post-HT layer comprising zirconium oxide 11 (optionally with nitrogen) is surprisingly scratch resistant thereby providing a heat treated scratch resistant coated article. It is noted that the phrase "zirconium oxide" as used herein includes $ZrO_2$ and/or any other stoichiometry where Zr is at least partially oxided.

The post-HT layer comprising zirconium oxide 11 may include from 0-30% nitrogen in certain example embodiments of this invention, more preferably from 0-20% nitrogen, even more preferably from 0-10% nitrogen, and most preferably from about 1-5% nitrogen in certain example embodiments of this invention. The post-HT layer comprising zirconium oxide 11 may include from about 10-70% Zr, more preferably from about 20-60% Zr, even more preferably from about 30-55% Zr, and most preferably from about 30-45% Zr in terms of atomic %. Moreover, the post-HT layer(s) comprising zirconium oxide 11 in certain example embodiments of this invention may include from about 10-85% oxygen, more preferably from about 30-80% oxygen, even more preferably from about 40-70% oxygen, and most preferably from about 50 to 70% oxygen.

In certain example embodiments of this invention, the post-HT layer comprising zirconium oxide 11 includes a nanocrystalline cubic lattice structure (although the pre-HT layer comprising zirconium nitride did not in certain instances). As explained above, zirconium nitride typically does not grow in cubic phase unless at a temperature of at least about 2,000 degrees C. It has surprisingly been found that the combustion generated during the HT may cause at least part of the pre-HT layer comprising zirconium nitride 7 to be heated sufficiently to cause it to grow in the cubic phase and become a post-HT layer 11 comprising a nanocrystalline cubic lattice structure including zirconium oxide (with or without nitrogen) which is very scratch resistant in certain example embodiments of this invention. It has surprisingly been found that the use of zirconium nitride (e.g., ZrN) in the pre-HT layer 7 is especially beneficial with respect to allowing a post-HT phase-transformed layer 11 including Zr to be formed which is very scratch resistant.

Following the heat treatment, the silver layer 6 is still present as shown in the middle and bottom portions of FIG. 1. However, the HT may cause the silver from layer 6 to begin to migrate or diffuse outwardly away from the glass substrate toward the surface 15 of the coated article (e.g., through layer(s) 11 and/or 12). Prior to the heat treatment, the zirconium inclusive layer 7 may have compressive stress and/or substantially no stress. However, the layer 7 may be designed so as to realize tensile stress after the HT. In certain example embodiments of this invention, the zirconium nitride and/or oxide inclusive layer 7 may be transformed by the HT process into a layer 11 of or including zirconium oxide which has a degree of tensile stress therein which was not present in the layer pre-HT. The tensile stress in layer 11 is advantageous in that it permits the layer 11 to be porous thereby allowing silver particles from the silver layer 6 to diffuse and/or migrate outwardly toward the surface 15 over time. In certain instances, the tensile stress can permits or cause crystal grain boundaries and/or tiny pinholes or nanoholes to be present in the layer 11 to allow silver migration therethrough toward the surface 15 of the coated article over time. Note that when optional photocatalytic layer 12 is not used, the surface 15 of the coated article is the top of the zirconium oxide based layer 11 (i.e., the final product may be as shown in the middle of FIG. 1 in certain instances). An example way in which to cause the post-HT layer comprising zirconium oxide 11 to have enough tensile stress to permit silver migration/diffusion is to dope the originally formed zirconium nitride and/or oxide layer 7 with Ce or the like. As explained above, the silver reaching the surface 15 of the coated article is advantageous in that it helps kill bacteria and/or germs on the surface of the coated article, thereby functioning as an anti-bacterial/anti-fungal agent.

In the FIG. 1, 3 embodiment, photocatalytic layer 12 is optional. However, the photocatalytic layer 12 may be applied on the glass substrate 1 over the zirconium oxide inclusive layer 11 in certain example embodiments of this invention as shown in FIGS. 1 and 3. When HT is used, the application of the photocatalytic layer 12 is typically performed following the HT as shown in FIG. 1. The photocatalytic layer 12 may be of any suitable photocatalytic material in different embodiments of this invention, but titanium oxide (e.g., $TiO_2$) is preferred in certain instances. The layer 12 is of or includes a photocatalytically active composition containing a photocatalytically active oxide of a transition metal (MO) or ($MO_2$) such as $TiO_2$ catalyst for producing a substantially transparent self-cleaning coating. The layer 12 will thus react with and decompose organic compounds or pollutants, deposited thereon from the environment, under the effects of exposure to sunlight such as UV. The organic pollutants are decomposed to simple inorganic compounds such as $CO_2$ and/or $H_2O$, and/or various mineral acids, which may re-enter the atmosphere and/or wash off due to rain, wind or the like, so that the coated article is self-cleaning with an efficiency that is dependent on the degree of photocatalytic activity in the catalyst, which may be proportional to the total surface area of the photocatalytic material particles to which the pollutants are exposed. For example and without limitation, when anatase $TiO_2$ is illuminated by ultraviolet (UV) radiation with a wavelength below about 390 nm, electrons in the valence band are excited to the conduction band leaving behind positive-charged holes which are reactive with absorbed water vapor hydroxide ions, resulting in the formation of positive-charged hydroxyl radicals, $(OH)^+$. The hydroxyl radicals in photocatalytic layer 12 are strong oxidizing radicals which can react with and strip pollutants to produce simpler, non-offensive products such as $CO_2$ and/or $H_2O$, or HCl is halogen pollutants are involved. It is noted that the photocatalytic layer 12 may include other material(s) such as an acrylic urethane polymer which may be used to improve wettability properties and/or reduce any potential yellow color due to layer 12.

Photocatalytic layer 12 may be formed on the glass substrate in any suitable manner. For example, the photocatalytic layer 12 may be deposited on the glass substrate 1 over layers 3, 6 and/or 11 using a spray technique, a spin coating technique, a flow coating technique, or the like. The photocatalytic layer 12 may be initially deposited in a wet form including colloids (e.g., titania colloids) in solution. For example and without limitation, the photocatalytic layer 12 may initially deposited as an application of a colloidal of anatase (e.g., from 0.1 to 2%, more preferably from 0.2 to 1.2% anatase $TiO_2$ in solution such as water or the like). The colloidal of anatase may be doped with Zn cations or the like in certain example instances. Anatase is a special crystalline form of titanium oxide which is photocatalytic. This colloidal may be deposited following the application of an underlying primer in certain instances. The primer (not shown) may be silica based in certain example embodiments of this invention, and may be deposited in any suitable manner including but not limited to spray, meniscus flow, or flame combustion. In certain example embodiments, an acidic catalyzed silica may be provided in the dispersion along with the titania colloids, or in a primer, in order to produce good wettability. An example acidic catalyzed silica is glycidoxypropyl trimethoxysilane. For example and without limitation, the photocatalytic layer 12 may be formed in any manner described in, and may be of any material described in, any of U.S. Pat. Nos. 6,884,752, 2005/0234178, 6,107,241, and/or 6,939,611, 6,235,401, the disclosures of which are all hereby incorporated herein by reference.

Heat may then be used to cure the colloidal layer, with the heat either being generated from a heat treatment oven, radiant heaters, or from a heat treatment performed just prior to application of the colloidal dispersion. Example heat treatments for curing the photocatalytic layer so as to remove the solution therefrom, leaving the titania to form photocatalytic layer 12, may be from about 200-600 degrees C., more preferably from about 400-550 degrees C., with an example being for about 3 minutes at about 500 degrees C. The time and temperature of the curing as well as the original size of the particles in the colloidal determines the scratch resistance of the layer 12. When the heat used in the curing causes the solution and/or solvent to evaporate or burn off thereby leaving the metal oxide (e.g., $TiO_2$) making up photocatalytic layer 12, the resulting photocatalytic layer 12 is porous in nature. This is because the metal oxide (e.g., $TiO_2$) molecules making up photocatalytic layer 12 are not very tightly packed together (the layer is not particularly dense) due to the previous presence of the solution or solvent which had taken up space between the metal oxide (e.g., $TiO_2$) molecules. The amount of nano-porosity in layer 12 can be used to (a) substantially match the refractive index (n) of the photocatalytic layer 12 to that of the zirconium inclusive layer 11, (b) improve the photocatalytic behavior of the layer 12, and/or (c) create nano-pores, pinholes and/or crystal grain boundaries which can be used as diffusion and/or migration paths for the silver particles from silver layer 6 to migrate toward the surface 15 of the coated article for anti-fungal/anti-bacterial purposes.

When $TiO_2$ is formed by sputter-deposition, it typically is very dense (is not porous), is not anatase, and has a refractive index (n) of at least 1.4. This would be undesirable because such a sputter-deposited $TiO_2$ layer would not be photocatalytic, would not substantially match the refractive index of underlying zirconium oxide based layer 11, and would not be porous to permit migration or diffusion of the silver to the surface 15 over time. However, when the $TiO_2$ is formed using a wet deposition of a colloidal dispersion or sol including titania, and is then heat treated to remove the liquid, the resulting layer 12 based on $TiO_2$ is highly desirable in that (a) it comprises anatase $TiO_2$ so that it is photocatalytic, (b) it is not very dense (due to the area previously occupied by the liquid) so that the refractive index is much less, and (c) due to its not very dense nature, it is porous and includes migration/diffusion paths for the silver to makes its way to the surface 15 of the coated article over time to cause an anti-bacterial/anti-fungal effect. Thus, in effect, silver from the silver layer can be substantially continuously pumped to the surface of the coated article over time so that silver can be provided at the surface of the coated article for long periods of time (e.g., months or even years in certain typical environmental conditions).

In certain example embodiments of this invention, the anatase titanium oxide (e.g., $TiO_2$) based photocatalytic layer 12 has a refractive index (n) of from about 1.75 to 2.15, more preferably from about 1.85 to 2.15, and most preferably from about 1.9 to 2.1, so as to substantially match the refractive index of the underlying zirconium oxide inclusive layer 11. In certain example embodiments of this invention, the zirconium oxide inclusive layer 11 has a refractive index (n) of from about 1.95 to 2.15, more preferably from about 2.0 to 2.1, with an example being about 2.05. In certain example embodiments the index of refraction of layer 12 does not differ from that of layer 11 by more than 0.1, more preferably by not more than about 0.05. Thus, it will be appreciated that the refractive indices (n) of the layers 11 and 12 can be surprisingly matched in the final product in certain example embodiments of this invention, even though they are of different materials typically having much different refractive indices. This matching of refractive indices of layers 11 and 12 is advantageous in that it permits a more desirable color of the final product to be achieved, and less reflectance to be achieved.

Another advantage of a $TiO_2$ photocatalytic layer 12 formed in the manner described above is that it can be made to have a very low contact angle thereby being hydrophilic. In certain example embodiments of this invention, the coated article with such a layer 12 can have a contact angle θ of no more than about 12 degrees, more preferably no more than about 10 degrees, and possibly no more than about 7 or 5 degrees. This is advantageous in that it allows fog or water to more easily shed off of the window in certain example embodiments of this invention.

In certain window and/or table-top embodiments of this invention, the coated article shown in FIG. 1, 3 has a visible transmission of at least about 50%, more preferably at least about 60%, and possibly at least about 70%. Such high visible transmissions are desirable for window applications.

For purposes of example only certain example thicknesses for the post-HT coated article shown at the bottom of FIG. 1 are set forth below, with the layers being listed in order from the glass substrate outwardly.

Example Coating (FIG. 1)

Layer Thicknesses (Post-HT)

| Layer | General | More Preferred | Most Preferred |
|---|---|---|---|
| Dielectric (layer 3) | 50-1,000 Å | 80-500 Å | 120-250 Å |
| Silver (layer 6) | 20-400 Å | 20-200 Å | 20-100 Å |
| ZrO:N (layer 11) | 50-800 Å | 70-600 Å | 100-350 Å |
| $TiO_2$ (layer 12) | 100-900 Å | 300-600 Å | 350-450 Å |

It can be seen from the above that post-HT Zr inclusive layer 11 is typically thicker than is pre-HT Zr inclusive layer 7. In other words, the thickness of the Zr inclusive layer may increase during HT. In certain example embodiments of this invention, the thickness of the Zr inclusive layer (e.g., from layer 7 to layer 11) may increase at least about 5% during or due to HT, more preferably at least about 10%, and most preferably at least about 40%. This increase in thickness is caused by the transformation of layer 7 into layer 11, where oxygen migrates into the post-HT layer 11 (i.e., more oxygen migrates into the post-HT layer 11 than nitrogen leaves in terms of atomic % and/or size in certain instances).

In certain example embodiments of this invention, the heat treated layer 11 comprising zirconium oxide includes $Zr_xO_y$, wherein y/x is from about 1.2 to 2.5, more preferably from about 1.4 to 2.1. Moreover, it is possible that residual carbon can remains in the zirconium oxide layer 11 following HT due to the presence of the pre-HT DLC layer 9. In certain example embodiments of this invention where DLC 9 was present prior to HT, the zirconium oxide layer 11 includes from 0.25 to 20% C, more preferably from 0.25 to 10% C, and most preferably from 0.25 to 5% C.

It has been found that doping zirconium nitride and/or oxide 7 with F and/or C prior to heat treatment tends to increase the visible transmission of the heat treated coated article. Doping with F and C results in a film with lower absorption compared to undoped films. Moreover, it has been found that the addition of F and/or C to these layers does not significantly change the optics of the coated article, or the biaxial film stress of the films prior to HT. Furthermore, when F and/or C are provided in layer 7, both scratch resistance and environmental stability (e.g., measured via salt fog test) of the HT product are substantially unaffected by the presence of F and/or C. Of course, following heat treatment the layer comprising zirconium oxide 11 may also be doped with F and/or C in a corresponding manner since it was present before HT. This doping of zirconium nitride (and/or zirconium oxide) with F and/or C may be used in conjunction with any embodiment discussed herein. In certain example embodiments of this invention, one or more of layers 7, 11 may be doped with from about 0.01 to 10.0% F, more preferably from about 0.1 to 8.0% F, even more preferably from about 0.3 to 5.0% F, still more preferably from about 0.4 to 2% F, and most preferably from about 0.5 to 1.0% F (in terms of atomic percent). Moreover, in certain example embodiments of this invention, one or more of layers 7, 11 may be doped with from about 0.01 to 10.0% C, more preferably from about 0.1 to 8.0% C, even more preferably from about 0.3 to 5.0% C, still more preferably from about 0.4 to 2% C, and most preferably from about 0.5 to 1.0% C (in terms of atomic percent). The doping with F and C may be used together so that one or more of layers 7, 11 is/are doped with both F and C in these amounts. Alternatively, only one of the dopants F and C may be used for a layer. Thus, in such alternative embodiments, one or more of layers 7, 11 may be doped with F in the aforesaid amount(s), but not doped with C. As yet another alternative, one or more of layers 7, 11 may be doped with C in the aforesaid amount(s), but not doped with F.

Another notable aspect of certain example embodiments of this invention is the extreme increase in visible transmission caused by heat treatment. In certain example embodiments, visible transmission increases by at least about 20 visible transmission % due to HT, more preferably at least 30%, and most preferably at least 40%. For example, in certain examples of this invention that have been made, the pre-HT visible transmission has been about 36-37%. Following heat treatment for about 400 seconds at about 640 degrees C., the post-HT visible transmission was about 77-81%. In each case, the visible transmission increased by about 40-45% due to HT. For purposes of example and understanding, if a pre-HT coated article had a visible transmission of 36% and following HT the post-HT coated article had a visible transmission of 80%, then the visible transmission increased 44% (i.e., 80%−36%=44%) due to HT. The apparent reason for this significant increase in visible transmission due to HT is the vanishing of at least some DLC due to HT because of the aforesaid combustion thereof. DLC blocks visible transmission to some extent, and its combustion and disappearance during HT allows visible transmission of the resulting HT coated article to significantly increase as shown above. Thus, not only does the DLC combustion act as a fuel which allows transformation of the Zr inclusive layer, but it also allows visible transmission to significantly increase An alternative embodiment of this invention, with reference to FIGS. 1 and 3, is to deposit silver (Ag) simultaneously with the $TiO_2$. In other words, the photocatalytic layer 12 would include both $TiO_2$ and Ag in such embodiments. Such an embodiment may or may not be used in combination with the provision of silver layer 6. In other words, the silver layer 6 may be eliminated if this approach is taken in certain instances, or it need not be eliminated if this approach is taken. For example, a simultaneous (along with the $TiO_2$) application of a colloidal silver can be performed in such a way that the photocatalytic layer 12 would also have an anti-bacterial/anti-fungal property as deposited, without the need for the diffusion/migration of the silver although this may still be possible. The silver particles deposited along with layer 12 can be chosen so as to have a size permitting them to fit between the $TiO_2$ particles in the photocatalytic layer 12 so as to also mechanically strengthen the coating into a metal-ceramic composite. In certain example embodiments of this invention, the layer 12 may include from about 50-99% $TiO_2$ (or some other photocatalytic or other suitable metal oxide) and from about 1-30% Ag. In certain such embodiments, the layer 12 may include from about 1-20% silver, more preferably from about 1-10% silver.

FIG. 2 is a schematic diagram illustrating a method of making a photocatalytic coated article according to another embodiment of this invention, before and after heat treatment. In particular, the FIG. 2 embodiment illustrates silver layer 6 and/or dielectric film 3 may be eliminated from the FIG. 1 embodiment. The FIG. 2 embodiment is the same as the FIG. 1 embodiment described above, except that dielectric film 3 and/or silver layer 6 are eliminated in the FIG. 2 embodiment. It is noted that the aforesaid options and characteristics (e.g., using a combination of silver and titanium oxide, layer thicknesses, how layers are deposited/formed, characteristics of layers, etc.) described with respect to the FIG. 1 embodiment as to elements 1, 7, 9, 11 and 12 are also applicable to the FIG. 2 embodiment because these layers are also present in the FIG. 2 embodiment.

For any embodiment herein, it is noted that the silver may be replaced with copper (Cu). For instance, copper may be used instead of silver for anti-bacterial and/or anti-fungal effects. In still further example embodiments of this invention, a mixture or combination of silver and copper may be used instead of only silver.

Any suitable type of glass substrate 1 may be used in different embodiments of this invention. For example, various types of soda lime silica glass or borosilicate glass may be used for substrate 1. However, in certain example embodiments of this invention, the coating of any of the aforesaid embodiments may be supported by a special type of glass substrate that has a very high visible transmission and a very clear color. In particular, in such certain example embodiments of this invention, the glass substrate 1 may be any of the glasses described in commonly owned U.S. patent application Ser. No. 10/667,975, the disclosure of which is hereby incorporated herein by reference. In certain preferred embodiments, the resulting glass has visible transmission of at least 85%, more preferably at least 88%, and most preferably at least 90% (e.g., at a reference thickness of about 0.219 inches or 5.56 mm). The advantage of using such a glass substrate 1 is that the resulting HT product is caused to have a visual appearance similar to that of uncoated clear glass—even though the coating is provided thereon. In addition to the base glass, examples of the glass batch and/or final glass are set forth below (in terms of weight percentage of the total glass composition, unless otherwise listed as ppm):

Example Colorants and Oxidizer Cerium in Glass Substrate

| Ingredient | General | Preferred | More Preferred | Best |
|---|---|---|---|---|
| total iron ($Fe_2O_3$): | 0.01-0.20% | 0.01-0.15% | 0.02-0.12% | 0.03 to 0.10% |
| cobalt oxide: | 0 to 15 ppm | 0.1 to 10 ppm | 0.5 to 5 ppm | 0.5 to 3 ppm |

-continued

| Ingredient | General | Preferred | More Preferred | Best |
|---|---|---|---|---|
| cerium oxide: | 0-1.0% | 0.01-1.0% | 0.01-0.5% | 0.05 to 0.2% |
| erbium oxide: | 0 to 1.0% | 0.01-0.30% | 0.02-0.20% | 0.02 to 0.15% |
| titanium oxide: | 0 to 0.5% | 0 to 0.2% | 0.001 to 0.05% | 0.01 to 0.02% |
| chromium oxide: | 0 to 10 ppm | 0 to 8 ppm | 0 to 5 ppm | 1 to 5 ppm |
| glass redox: | <=0.20 | <=0.12 | <=0.10 | <=0.08 |
| % FeO: | 0.0001-0.05% | 0.0001-0.01% | 0.001-0.008% | 0.001-0.003% |

It is noted that in other embodiments of this invention, additional layers (not shown) may be added to the coated articles discussed above, and/or certain layer(s) may be deleted.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making an anti-bacterial coated article, the method comprising:
providing a glass substrate;
forming a layer comprising silver on the glass substrate;
forming a porous layer comprising a metal oxide on the glass substrate over at least the layer comprising silver, so that the porous layer comprising the metal oxide is sufficient porous so as to cause silver from the layer comprising silver to migrate and/or diffuse outwardly to the surface of the coated article over time.

2. The method of claim 1, further comprising forming a layer comprising zirconium nitride on the glass substrate over at least the layer comprising silver, and then heat treating the glass substrate with the layer comprising zirconium nitride thereon in a manner so that following the heat treating the layer comprising zirconium nitride has transformed into a porous layer comprising zirconium oxide which is said porous layer comprising the metal oxide.

3. The method of claim 1, further comprising forming a porous photocatalytic layer on the glass substrate over at least the porous layer comprising the metal oxide.

4. A method of making a coated article, the method comprising:
providing a glass substrate;
depositing in wet form on the glass substrate a colloidal dispersion including each of metal oxide colloids and silver colloids; and
curing the colloidal dispersion so as to form an anti-bacterial and/or anti-fungal layer comprising each of the metal oxide and silver as an outermost layer of a coating on the glass substrate.

5. The method of claim 4, wherein a layer comprising zirconium oxide is provided between the glass substrate and the anti-bacterial and/or anti-fungal layer, and wherein the metal oxide is an oxide of titanium.

* * * * *